United States Patent

Burgan et al.

[11] Patent Number: 5,758,888
[45] Date of Patent: Jun. 2, 1998

[54] REFUSE CONTAINER AND DOLLY HAVING FOOT ACTIVATED RELEASE MECHANISM

[75] Inventors: Eric R. Burgan, Raleigh, N.C.; Donald C. Presnell, Stephens City; Harold E. Ruckman, Winchester, both of Va.

[73] Assignee: Rubbermaid Commercial Products Inc., Winchester, Va.

[21] Appl. No.: 513,268

[22] Filed: Aug. 10, 1995

[51] Int. Cl.⁶ ............................................. B62B 3/00
[52] U.S. Cl. ................. 280/47.34; 280/79.5; 220/908
[58] Field of Search ........................... 280/47.17, 47.31, 280/47.34, 47.26, 79.2, 79.5; 220/625, 630, 669, 729, 908, 244, 290, 318, 335

[56] References Cited

U.S. PATENT DOCUMENTS

| D. 253,932 | 1/1980 | Mockler | D7/194 |
|---|---|---|---|
| D. 261,720 | 11/1981 | Brazis | D34/9 |
| D. 322,350 | 12/1991 | Craft et al. | D34/9 |
| D. 327,756 | 7/1992 | Klein et al. | D34/1 |
| D. 332,852 | 1/1993 | Delmerico | D34/9 |
| 806,885 | 12/1905 | Focht | 280/47.26 |
| 926,288 | 6/1909 | Rice | 248/129 |
| 2,532,165 | 11/1950 | Hermani | 220/36 |
| 2,549,572 | 4/1951 | Campanelli | 220/41 |
| 2,615,663 | 10/1952 | Hamilton | 248/147 |
| 2,811,329 | 10/1957 | Press et al. | 248/147 |
| 2,910,206 | 10/1959 | Hodgson | 220/17 |
| 3,125,353 | 3/1964 | Göhmann | 280/47.34 |
| 3,269,563 | 8/1966 | Tolbert | 220/23.4 |
| 3,390,804 | 7/1968 | Morgan | 220/908 |
| 3,618,795 | 11/1971 | Burch | 220/630 |
| 3,858,929 | 1/1975 | Brescia | 280/47.12 |
| 3,904,218 | 9/1975 | Kostie | 280/79.2 |
| 4,217,073 | 8/1980 | Propst | 414/421 |
| 4,222,580 | 9/1980 | Krokonko | 280/47.34 |
| 4,279,357 | 7/1981 | Robinson | 220/318 |
| 4,313,612 | 2/1982 | Rubens | 280/79.1 |
| 4,420,168 | 12/1983 | Dewing | 220/908 |
| 4,785,964 | 11/1988 | Miller et al. | 220/263 |
| 4,821,903 | 4/1989 | Hayes | 280/47.26 |
| 4,865,214 | 9/1989 | Kola et al. | 220/263 |
| 4,930,653 | 6/1990 | Machando | 220/23.4 |
| 4,953,740 | 9/1990 | Koda | 220/263 |
| 4,995,529 | 2/1991 | Sher | 220/475 |
| 5,005,729 | 4/1991 | Hollman | 220/908 |
| 5,074,572 | 12/1991 | Delmerico et al. | 280/47.34 |
| 5,141,124 | 8/1992 | Smith et al. | 220/335 |
| 5,230,525 | 7/1993 | Delmerico et al. | 280/47.131 |
| 5,472,220 | 12/1995 | Stephan | 280/79.5 |
| 5,599,037 | 2/1997 | Spickler | 280/47.26 |

OTHER PUBLICATIONS

Pp. 4 and 10, Refuse containers and dollies; Continental Manufacturing Company. A Division of Contico International, Inc., 123 Byassee Drive, Hazelwood, Missouri 63042. Published at least as early as Oct., 1994.

Sell sheet, Refuse containers and dolly; Tucker Housewares, A Mobile Company, 25 Tucker Drive, Leominster, Massachusetts 01453. Published at least as early as May, 1994.

*Primary Examiner*—Brian L. Johnson
*Assistant Examiner*—Frank Vanaman
*Attorney, Agent, or Firm*—Richard B. O'Planick

[57] ABSTRACT

A container (10) and dolly (14) assembly, comprising a container having a planar rearward side (18) and a lid (12) that is pivotally coupled to one of the container handles (34) and pivots thereabout into a vertical orientation against the container (10). Retention flanges (45, 80) of the container (10) and the lid (12), respectively, overlap to lock the lid in the open position. A dolly (14) is provided having upwardly directed tine members (118, 122) that engage container flanges (58, 60) as the container is lowered upon the dolly to latch the container and dolly together. A pivotal foot pedal (38) is disclosed, operable to laterally move one dolly tine member (122) and thereby facilitate disengagement of both container flanges (58, 60) from the dolly tine members (118, 120).

45 Claims, 12 Drawing Sheets

REFUSE CONTAINER AND DOLLY HAVING FOOT ACTIVATED RELEASE MECHANISM

BACKGROUND OF THE INVENTION

1. Field of the Invention

The subject invention relates generally to refuse container and dolly assemblies and, more specifically, to such assemblies providing for the attachment and release of a refuse container from the upper Support surface of a wheeled mobile dolly.

2. The Prior Art

Conventional refuse containers typically arc cylindrical and of plastic construction, and may be sold with or Without a lid and with or without a wheeled carriage, or dolly. Most commonly, lids are completely detachable from the container. Typically, such lids are attached and detached by employing two diametrically opposed catches.

While the aforementioned lid and container combinations work well, several deficiencies make their use less than satisfactory. First, normally two free hands are needed to engage or disengage the lid conveniently. This can prove cumbersome. Secondly, lids are often lost, especially in commercial environments. This and the general inconvenience associated With their use often results in the separation of containers from their lids, even where necessitated by sanitary reasons or required by local law.

Hinged lids may be used to overcome these deficiencies, but the cost of available hinged lid assemblies is generally prohibitive. Moreover, conventional hinged lid assemblies are cumbersome in use and such non-removable lids, swinging uncontrollably, can impede efforts to conveniently and thoroughly clean the containers. Also, such lids, swinging freely and uncontrollably, can hinder a user in the dumping of the container contents.

Similarly, conventional dollies are deficient in meeting the needs of the user in that they are attached and detached in a manner which is inconvenient. Moreover, such dollies are unsanitary and are not particularly ergonomic in operation. Available refuse container dollies use variants of a "bayonet" or screw attachment design. Accordingly, the container is placed onto the dolly, or the container is inverted and the dolly placed thereon, and the mating bayonet flights or threads between the container and dolly are engaged. The dolly and container are then rotated with respect to one another until the dolly and container have been drawn up snugly against one another.

The inconvenience of the aforementioned assembly will be readily appreciated. In order to accomplish such a physical act, a user must place the container upright on the dolly, grasp the dolly between the user's feet, and tighten the container down. Often a user cannot be certain that the engagement has been successfully accomplished or sufficiently tight to avoid a disastrous unexpected separation of the dolly from the container.

Alternatively, a user must bend down to hold the dolly with one hand while rotating container with the other. This exposes the user to the accumulated dirt and other contaminants on the dolly and, again, cannot be accomplished with absolute certainty that the engagement was successful. For those workers who have physical limitations, such a procedure can be impossible.

Still, alternatively, the container can be positioned inverted upon the floor, secured between a user's feet and the dolly manually rotated to the bottom. This also subjects the user to the accumulated dirt on the dolly, and to the uncertainty that engagement has not been successfully achieved.

In addition to the difficulties attendant the above assembly and disassembly operation, there are an additional number of disadvantages to the present method of dolly attachment relative to the use of the assembly. A first drawback is the dolly's tendency to be rotated unintentionally as the assembly is pulled across thresholds that impede the dolly's wheels. If such inadvertent rotation further tightens the dolly, it can be rendered difficult to remove. If such rotation loosens the dolly, it can disengage and cause serious injury if the user subsequently trips over the disattached dolly. In short, substantial safety issues result in conventional dolly assemblies where the user cannot ascertain whether the dolly is secured to the container.

SUMMARY OF THE PRESENT INVENTION

The present invention overcomes the aforementioned deficiencies by providing a dolly and container assembly having, enhanced operator convenience and safety. The refuse container body is configured having a D-shaped cross-sectional configuration, with handles extending from radiussed sidewalls proximate to the planar rearward container side. Accordingly, a user can comfortably lift the container by the handles while positioned against the container planar side and thereby easily carry the container. The lid member is pivotally mounted to one of the handles and swings open to the side of the container. In the vertical, open orientation, the lid latches to the container side, thereby remaining stationary and out of the way of the user.

A dolly is provided having an upper circular support surface for supporting the bottom of the container. The dolly further comprises upwardly projecting divergent tines, each having one end integrally formed with the dolly top surface and a free remote end extending, above the dolly. The free ends of the tines are downwardly beveled and engage horizontal flanges in the underside of the container as the container is lowered upon the dolly support surface. Resultingly, the tine members laterally move inward until the container flange edges clear the tine remote ends. As the container moves downward, the tine members resiliently move laterally outward and resume their original orientation, and the remote tine ends latch over the container flange edges with an audible sound to secure the container and the dolly together.

The dolly is further provided with a downward cavity at one end and a loot pedal member pivotally mounted within the cavity. The foot pedal comprises a forward actuator end that engages an outside surface of one of the tine members and a rearward foot plate. Downward depression of the foot plate rotates the foot pedal and causes the actuator end to press the one tine member inward, whereby releasing, the container from its locking engagement with the dolly. Thus, assembly of the container to the dolly requires no user contact with the dolly and is positively assured by the audible latching of the tine members over the container flanges. Likewise disattachment of the container is positively assured by operation of the foot pedal to disengage the one locking tine. In addition, the lid, pivoting and locking to one side of the container, does not interfere with movement of the dolly and container by the user or with attaching and detaching the container and dolly.

Accordingly, it is an objective of the present invention to provide a container and dolly assembly having, a container lid that assembles to the container without hardware and tools, and locks into an open condition in a manner that does not interfere with operation of the dolly or container.

A further objective is to provide a container and dolly assembly having an improved mechanism for attaching the container to the dolly.

Yet another objective is to provide a container and dolly assembly having a positive locking mechanism between the container and dolly.

Still a further objective is to provide a container and dolly assembly having an improved ergonomic shape for enhanced convenience and utility.

Another objective is to provide a container and dolly that can be attached and detached by the user without grasping the dolly or bending.

A further objective is to provide a container and dolly attachment mechanism that provides tactile and audible feedback to the user of the attachment status.

It is also an objective to provide a container and dolly having a foot actuated attachment/detachment mechanism.

Yet another objective is to provide a container and dolly having a secure attachment mechanism that is easy and convenient to use, and that is not degraded through use.

An additional objective is to provide a container and dolly that are economically and readily produced, readily assembled, and convenient in operation.

These and other objectives, which will be apparent to those skilled in the art, are achieved by a preferred embodiment that is described in detail below and which is illustrated by the accompanying drawings.

DESCRIPTION OF THE PREFERRED EMBODIMENT

Figure 1:
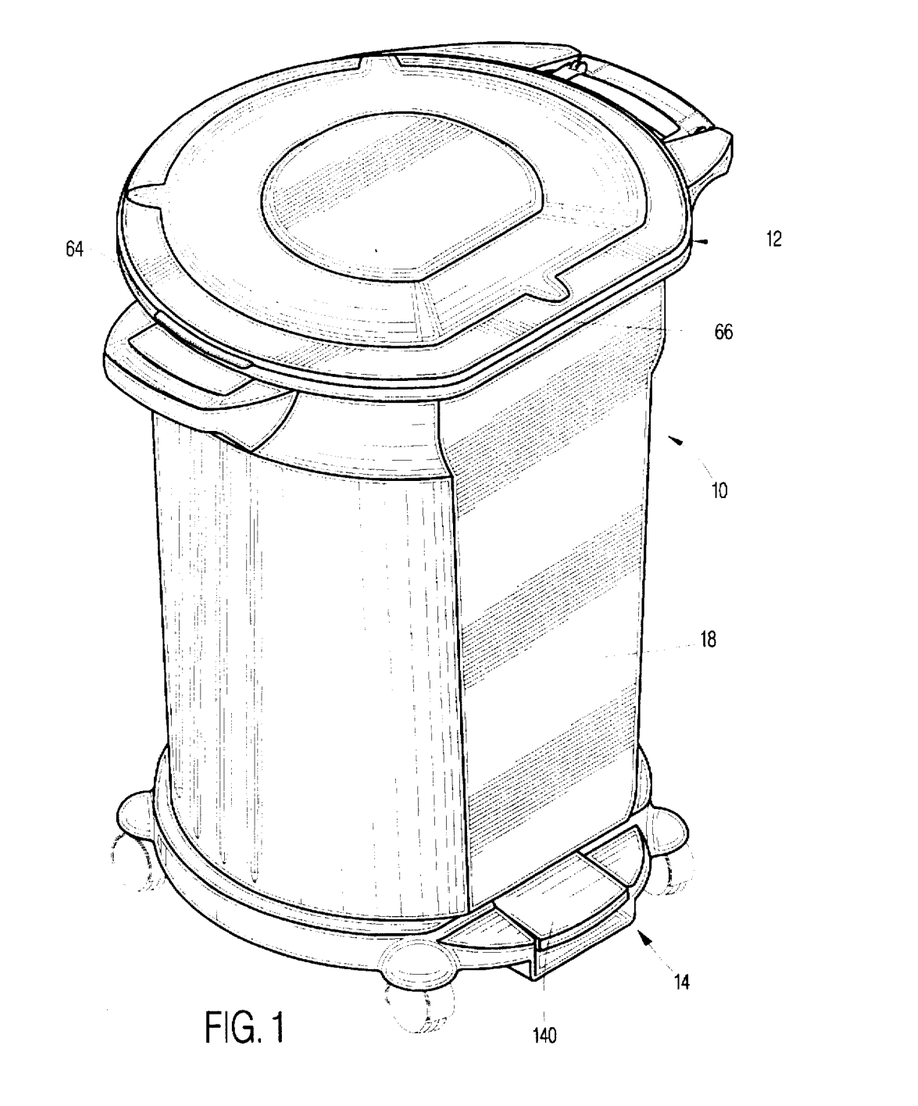
FIG. 1 is an assembled perspective view of the subject container and dolly.
Figure 2:
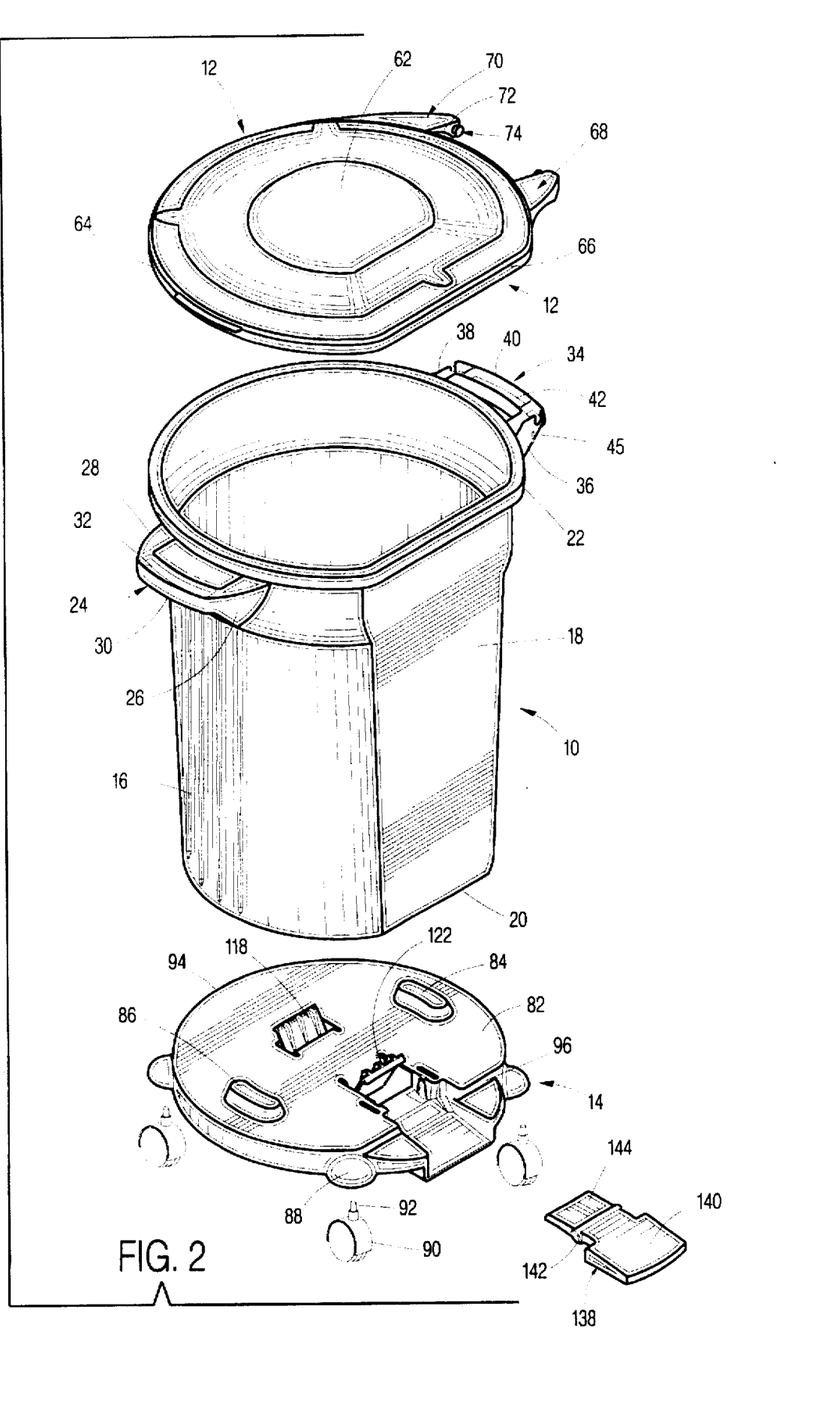
FIG. 2 is an exploded perspective view thereof.
Figure 3:
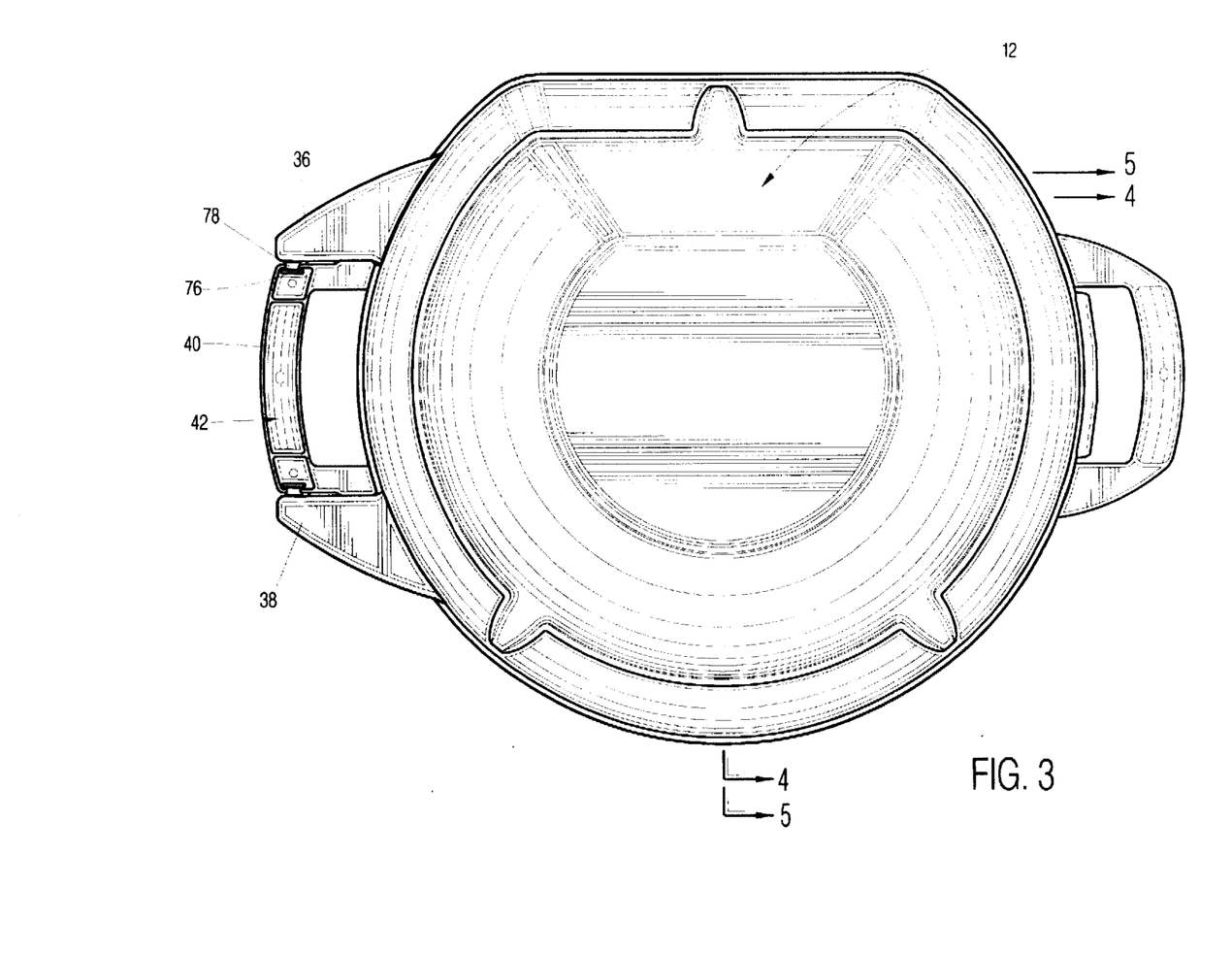
FIG. 3 is a top plan view thereof.
Figure 10:
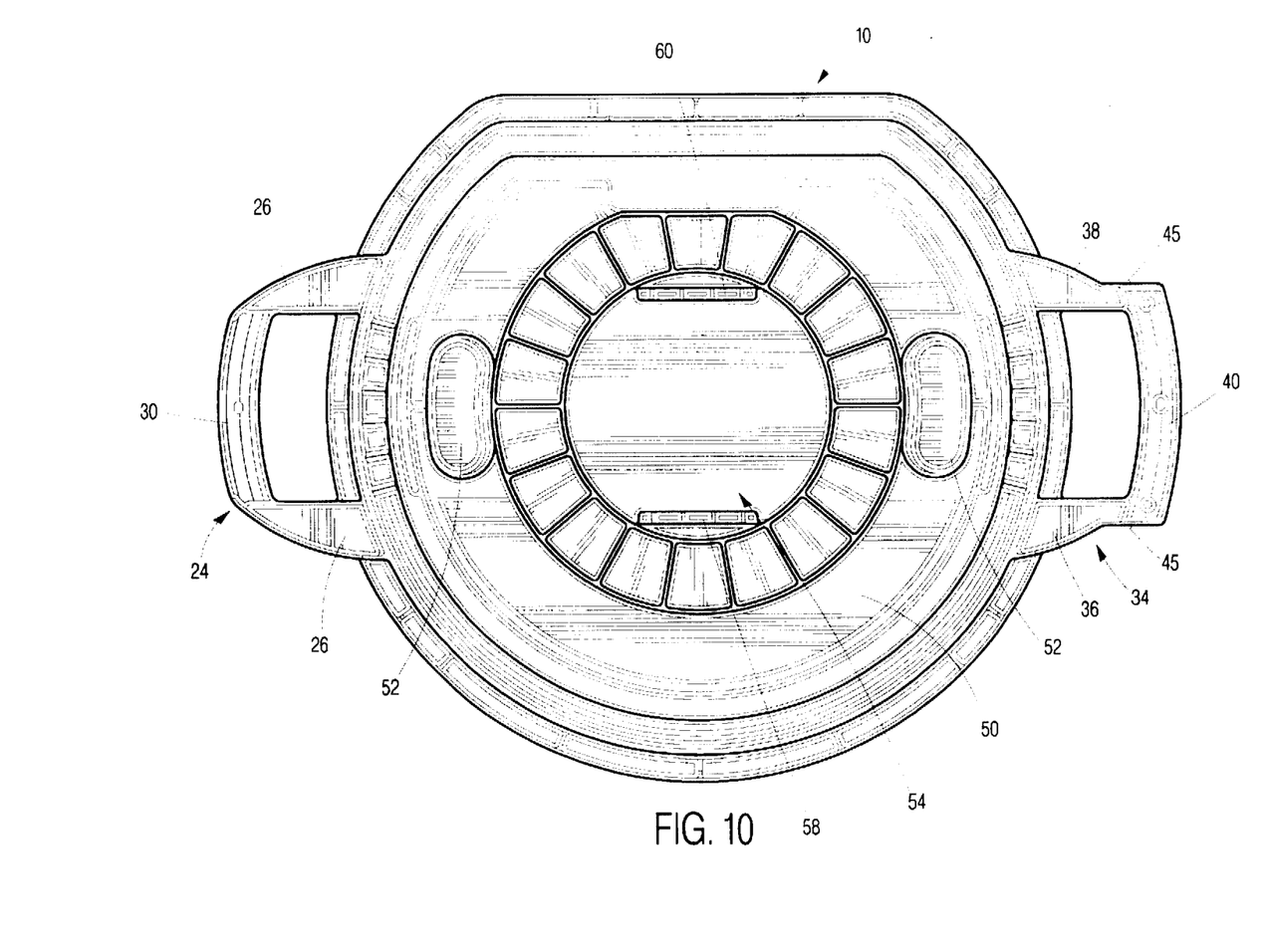
FIG. 10 is a bottom plan view of the container.

Referring first to FIGS. 1, 2, and 10, the subject assembly comprises three primary plastic, injection molded components; a refuse container 10, a lid 12, and a dolly 14. Suitable commercial grade polyethylene can be utilized in the formation of such components by conventional plastic molding techniques.

The container 10 is generally cylindrical, comprising forward radiussed sidewalls 16. A rearward sidewall 18 of the container is substantially planar, having vertical edges which intersect the radiussed sidewalls 16, making the container generally D-shaped in cross-section. The sidewalls 16, 18 extend from a lower container end 20 to an upper peripheral rim 22.

Disposed on diametrically opposite sides of the radiussed sidewalls 16, proximate the upper rim 22 and proximate opposite edges of the planar sidewall are outwardly projecting handles 24, 34. The handle 24 comprises spaced apart side plates 26, 28, each having an inward end connected to the sidewalls 16, 18 and a U-shaped in section cross bar 30 connecting outward ends of the plates 26, 28. The cross bar 30 is of elongate configuration, radiussed across the bottom and forming a channel 32 along the top.

Figure 9:
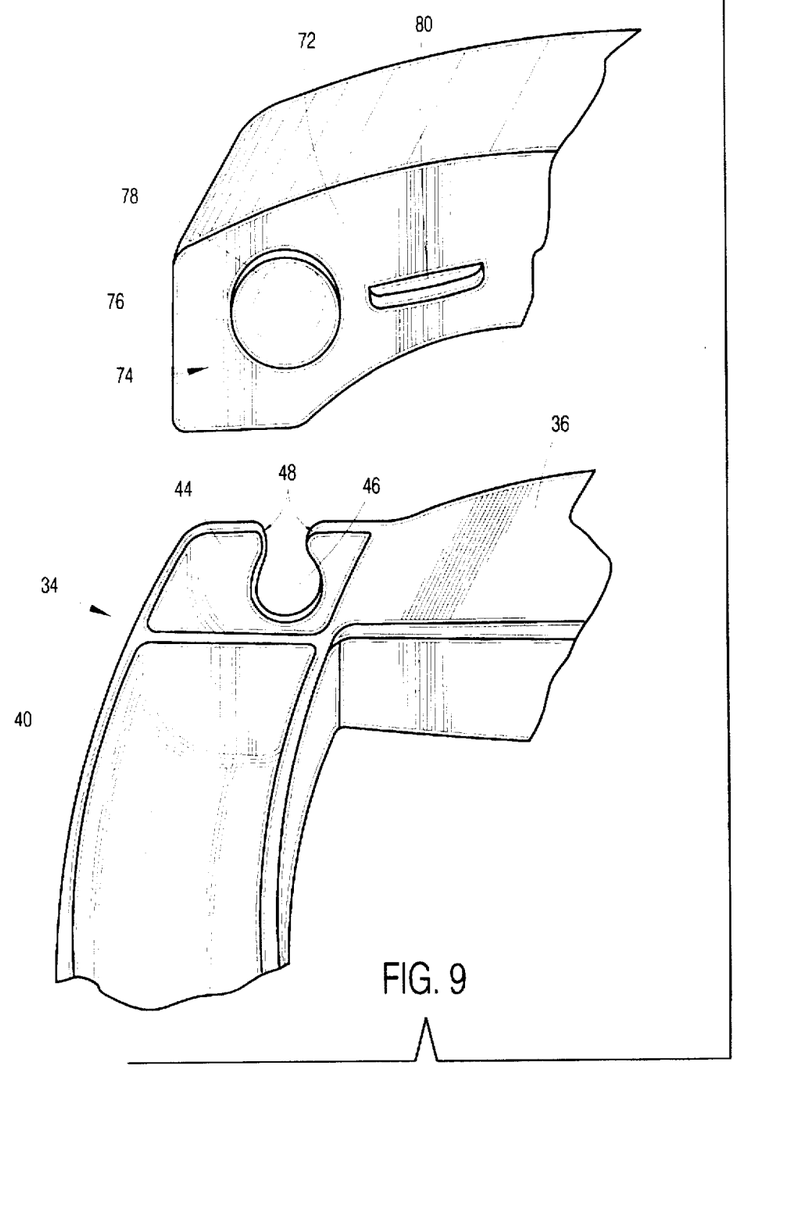
FIG. 9 is an enlarged exploded perspective view of the pivotal attachment between lid and the container handle.

Referring to FIGS. 2, 9, and 10, the handle 34 likewise comprises spaced apart side plates 36, 38, and a U-shaped in section, elongate cross bar 40. Cross bar 40 includes a dependent U-shaped channel 42 extending between end walls 44. Extending downwardly into each end wall 44 from an upper edge is a pivot pin slot 46 leaving a circular, relatively large lower portion and a narrow pinch point 48 at the upper mouth. A vertically extending, outwardly projecting retention flange 45 is formed to extend along opposite side plates 36, 38 of the container handle 34.

Figure 4:
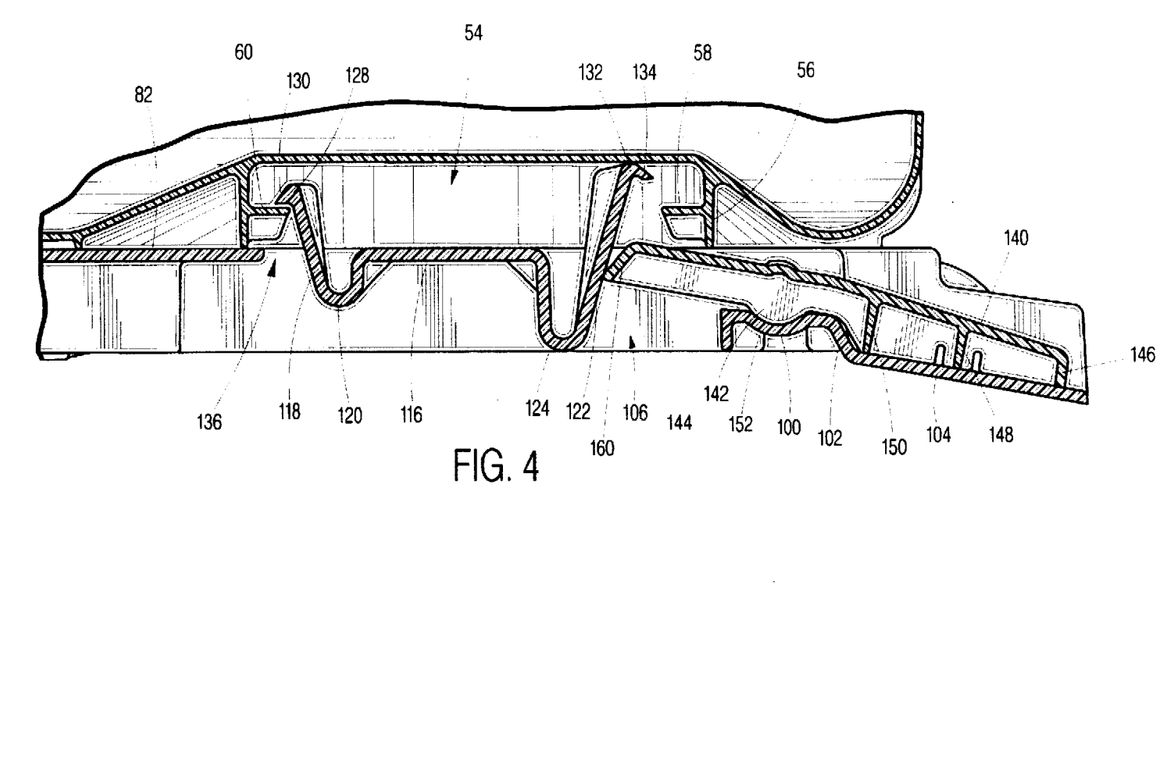
FIG. 4 is a sectional view through the container bottom and dolly foot pedal assembly, shown in the unlatching condition, taken along the line 4—4 of FIG. 3.

With reference to FIGS. 4 and 10, the container 10 has a generally flat bottom surface 50 and a pair of diametrically opposed hand recesses 52 which extend upward into the surface 50 at a location below the handles 24, 34. The bottom surface 50 comprises a further central recess 54 of elongate, generally elliptical shape, defined by a dependent peripheral skirt 56. Extending along linear ends of the recess 54 are horizontal flanges or ledges 58, 60. The flanges 58, 60 are spaced apart and are projected in opposition as best shown by FIGS. 4 and 10.

FIGS. 2 and 9 illustrate the configuration of the lid 12. The lid component 12 comprises a domed top surface 62 that merges along a peripheral edge with a dependent skirt. The skirt includes radiussed forward portion 64 and a planar rearward portion 66 such that the lid 12 is of a general D-shape to compliment the shape of the container 10. A pair of spaced apart arms 68, 70 extend outward from radiussed skirt portion 64, each arm 68, 70 having an inwardly directed surface 72. A hinge pin 74 projects inward from each arm 68, 70 and comprises a large diametered circular head 76 and a smaller diametered stem 78. Extending along each surface 72 adjacent each hinge pin 74 is an elongate retention flange 80.

Referring, to FIGS. 2, 4, 5, and 7, the dolly 14 is constructed to have a circular, generally planar top surface 82. Two diametrically opposite registration protrusions 84, 86 extend upward from surface 82, each complementarily shaped to the hand recesses 52 in the bottom of container 10. Four integrally molded spaced apart caster sockets 88 project outward from the dolly 14, each having a downwardly opening axial bore adapted to receive the upwardly projecting post 92 of a caster 90.

The dolly 14 has radiussed side walls 94 which extend peripherally rearward from a forward end of the dolly, and a planar vertical step crosses the dolly at the dolly at a rearward end, marking the rearward boundary of surface 82. A foot pedal cavity 98, as best viewed from FIGS. 2, 4, 6, and 7, extends downwardly into the top of the dolly at the rearward end to a bottom floor. The floor comprises a concave forward surface 100, a sharply inclined intermediate surface 102, and a ramped rearward surface 104. In front of the forward cavity surface 100 is a through opening 106 that extends through the dolly from a top side to a bottom side.

The cavity 98 is defined by opposed sidewalls 112, 113 into each of which an inverted U-shape pivot post socket 108 extends positioned along cavity 98 at the concave surface 100. A detent 110 extends into a top edge of sidewalls 112, 113 above each of the sockets 108.

Figure 7:
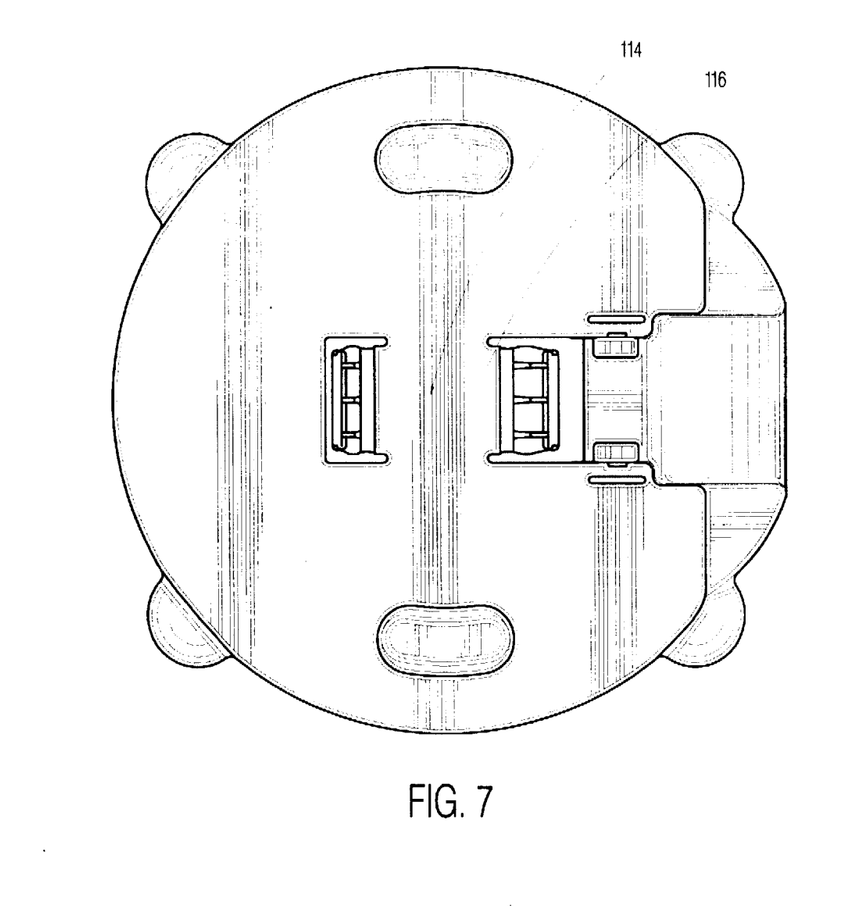
FIG. 7 is a top plan view of the dolly.
Figure 8:
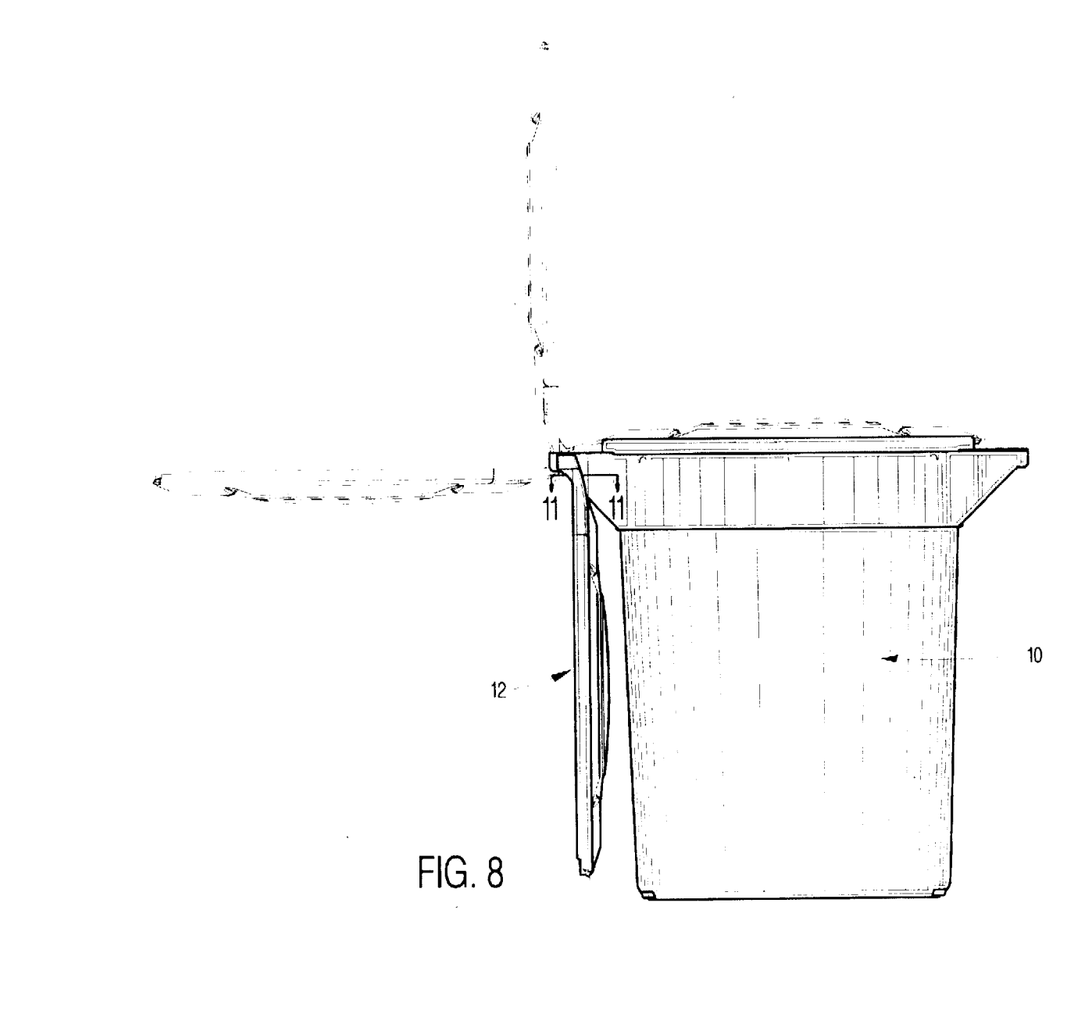
FIG. 8 is a side elevation view of the container illustrating the range of lid movement.

A central region 114 of the dolly 14 is molded to provide a planar bridging surface 116, as best shown in FIGS. 2, 4, and 7. A forwardly disposed, upwardly directed, tine member 118 is joined to a forward end of the bridging surface by a reversely formed bight portion 120, and a rearwardly disposed, upwardly directed, tine member 122 is joined to a rearward end of the bridging surface 116 by a reversely formed bight portion 124. The tine members 118, 122 are rectangular plates in configuration, projecting upward from the surface 116 at complimentary divergent angles; member 118 at approximately an obtuse angle of 100 degrees inclination and member 122 at an acute angle of 80 degrees of inclination.

Moreover, the tine members represent cantilevered spring plates for latching purposes explained below. The forward tine member 118 has an upper formed over end portion 128 that presents a downwardly angled upper beveled surface 130. The rearward tine member 122 has an upper formed over end portion 132 that presents a downwardly angled upper beveled surface 134. While the upper end portions 128, 132 of the tine members are at equal elevation, the bight connective portion 120 of forward tine member 118 is shorter, as will be appreciated by FIGS. 4 and 5, and the bight connective portion 124 of rearward tine member 122 is longer as shown. Consequently, tine member 118 is shorter than tine member 122 and has less resiliency and flex. Member 122 is, to the contrary, longer and is therefore more flexible in lateral directions toward and away from the bridging surface 116

Below the forward tine member 118 is a through opening 136 that extends from a top side of the dolly to the bottom. The tine members 118 and 122 are integrally formed with the dolly body through the openings 136, 106 during the molding process. Accordingly, the dolly is an integrally molded unit that requires no consumer assembly other than the casters and incorporates through tine members 118, 122, integral latching members of resilient and flexible plastic construction.

Figure 6:
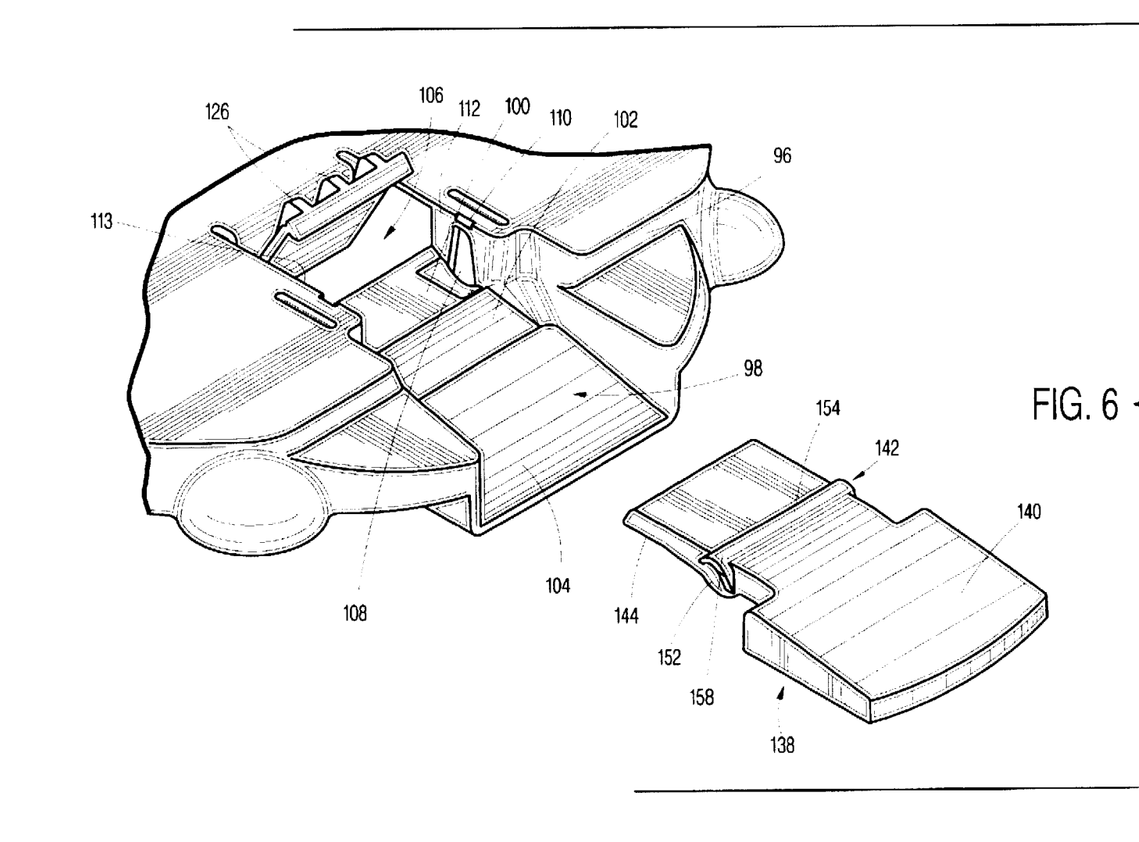
FIG. 6 is an enlarged perspective view of the foot pedal assembly.

The dolly further includes an actuating foot pedal 138, the pedal having a rearwardly disposed flat foot plate 140, five intermediately located separate and spaced apart pivot bearing portions 142 formed as integral, semi-circular dependent radiussed portions three longitudinal flanges 143 and side portions of a dependent peripheral skirt 146 or, alternately, a single intermediately located pivot bearing portion may be formed extending the approximate width of the pedal 118. A forward actuating plate 144 extends forwardly from the pedal 138. The pedal 138 is integrally molded as one body. As shown in FIGS. 4 and 6, the dependent peripheral skirt 146 extends about the periphery of the pedal 138 and spaced apart support flanges 148, 150 transversely span the underside of the foot plate 140. The bearing portion is formed as comprising the collective radiussed bottom surfaces 152 of the dependent flanges 143 and the radiussed top surface 154.

Extending outward from opposite ends of the surface 154 are wing extensions 156, 160 having a radiussed, downwardly concave shape. The forward end portion 160 of the pedal 138 is downwardly formed at an acute angle and represents the pedal portion which engages tine member 122 as described below.

From the foregoing and in reference to FIGS. 1, 2, 3, 8, and 9, it will be appreciated that the hinged lid 12 is operated by a one-hand procedure in a convenient manner. The lid 12 is fully and easily detached from the container 10 by simple upwards disengagement of the lid hinge pins 74 from the container bearing slots 46 by passing the pins 74 past the pinch points 48, to substantial advantage. First, the upward disengagement motion is easy and fast, as the hinge pins are conveniently accessible. Secondly, the weight of the lid will always be positively supported by the container bearing slots 46 or container rim regardless of the position of the lid.

The user of the container, by intended design and orientation of the handles, naturally will stand adjacent to the flat side 18 of the container to lift and carry the container. The flat side 18 enables the user to carry the container closer to the body, making for enhanced comfort and more efficient application of lifting force. Moreover, the orientation of the lid provides substantial advantage. The user can, by single handed operation, open the lid by lifting handle 162 and rotate into the vertical orientation shown in FIG. 8 without moving from the user's customary location against side 18. In the lid open condition, the user can move the container or insert matter into the container without moving.

The hinge pins 74 are of a head and stem configuration and are sized relative to the slots 46. It will be appreciated that, in the configuration shown, it is not necessary to have a head on the end of the hinge pin stem 78. If one is used, its diameter must be greater than the stem diameter in order to be useful. If a head is not used on the hinge pin stem, then preferably the stem should be long enough to sufficiently prevent the hinge pin from inadvertently dislodging from the slots 46. The distance between the pinch points 48 should be smaller than the diameter of the hinge pin stem 78 and large enough to allow a "snap" removal of the hinge pin stem from the slots 46. In short, the sizing of the slots 46 and the stems 78 of the hinge pins are complementary and interdependent.

Figure 11:
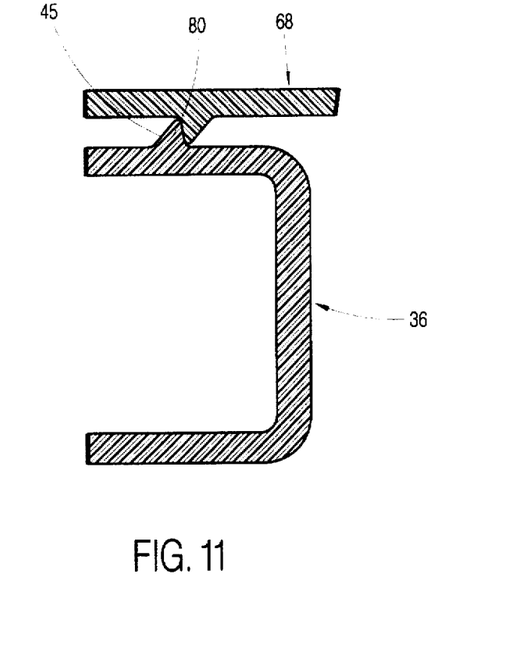
FIG. 11 is a sectional view through the lid to container latch, taken along the line 11—11 of FIG. 10.
Figure 12:
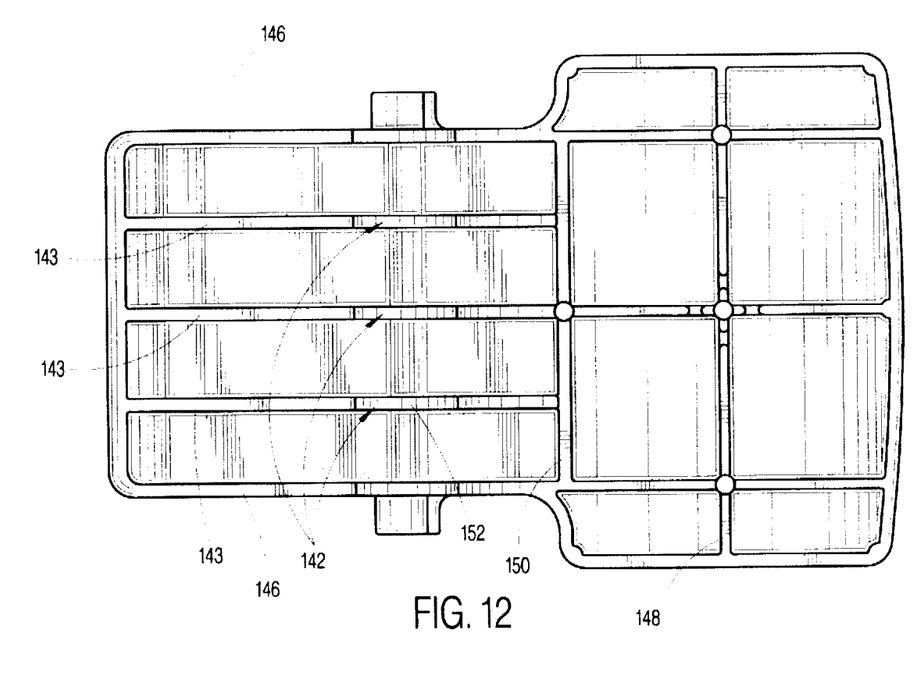
FIG. 12 is a bottom plan view of the foot pedal.

Additionally, the retaining tabs or flanges 45, 80 on the lid aims 68, 70 as seen in FIGS. 2, 9, and 11 must be sized relative to each other to mutually engage in order to retain the lid in a fully open position and yet allow subsequent closure. Locking the lid open assists during loading, and dumping of the container 10. FIG. 11 shows the ramped sides of the abutting flanges 45, 80 that facilitate the interference progression of the lid flange 80 over the container flange 45 as the lid assumes a fully open, vertical position. The ramped sides further facilitate subsequent reverse progression of the flange 80 over the flange 45 as the lid is closed.

Assembly and operation of the dolly proceeds as follows. Referring to FIGS. 2, 4, and 6, the pedal 138 inserts downwardly into the cavity 98, whereupon wing extensions 156, 158 snap into the sockets 108. So seated, the radiussed underside 152 of the pedal portion 142 resides within the concave floor portion 100; pedal actuating plate 144 projects forward over the opening 106 and below tine member 122; and pedal foot plate 140 is disposed above the ramped surface 104 of the cavity 98. The wing extensions 156, 158 project into the sockets 108 to render the pedal pivotal within the cavity 98 between the depressed position shown in FIG. 4 and the released position of FIG. 5. Thus, extensions 156, 158 serve as pivot pins about which the pedal can pivot.

Figure 5:
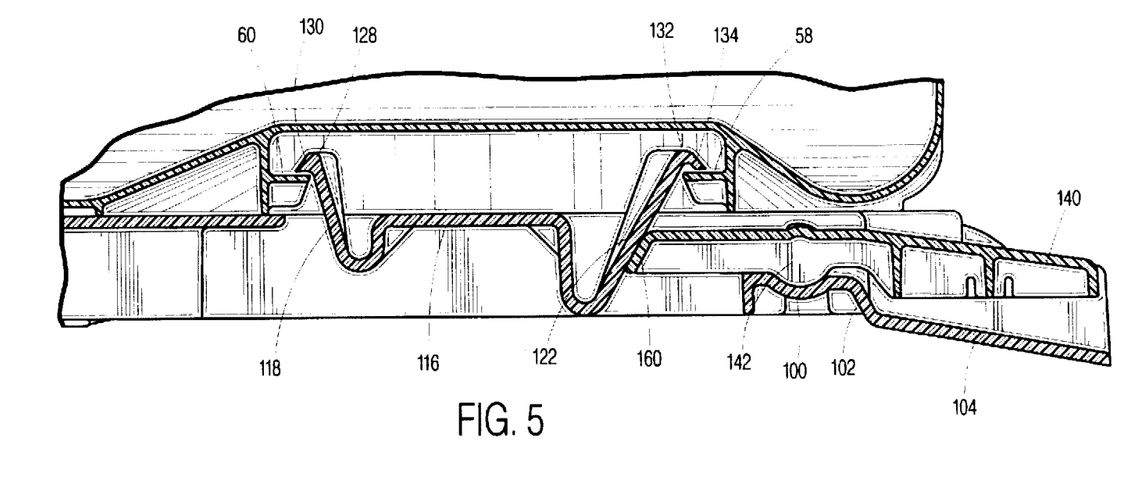
FIG. 5 is a sectional view through the container bottom and dolly foot pedal assembly, shown in the latched condition, taken along the line 5—5 of FIG. 3.

Continuing the position of the pedal in the quiescent, or released position of FIG. 5 is such that the surface 160 of the actuating plate 144 abuts against the outward surface of the tine member 122. The angle of decline of surface 160 is complementary to the angle of incline of tine member 122 so that the surfaces thereof meet flush as shown. In the quiescent or released position the foot plate 140 is raised above the cavity floor portion 104 and prevented from falling by the tine member 122 keeping the actuating, plate 144 end from rising. While the pedal 138 and the cavity 98 are configured pursuant to the above, other configurations for pivotally mounting the pedal 138 into one end of the dolly may he utilized if so desired. For example, a pivot rod securement of the pedal within the cavity can be used, although the subject preferred embodiment offers the advantage of a fastenerless method of assembly with no tools required.

To mount the container 10 upon the dolly 14, a user need only lift the container (preferably from a location adjacent the flat side thereof), and, from a standing position, lower the container to its final destination upon surface 82. Guidance is provided by passage of registration protrusions 84, 86 into hand recesses 52, to facilitate engagement of the container 10 with tine members 118, 122. As the lower end of the container 10 reaches the tine members 118, 122, inward ends of the container retention flanges 58, 60 engage the tine surfaces 134, 130, respectively, and force the tine members inward until the distance between tine ends 32 is sufficiently narrow to allow the container retention flanges 58, 60 to pass. As the flanges 58, 60 clear the tine ends 32, the tine members 118, 122 resiliently snap outward and back into their respective quiescent orientations. The return of the tine members 118, 122 is accompanied by a positive audible sound and tactile feel as the underside of tine ends 32 latch over the top of the flanges 58, 60. Accordingly, a user will positively know that a secure lock has been achieved.

When container and dolly are fully engaged, the registration protrusions 84 and 86 securely engaged within container hand recesses 52 serve as holding blocks to take lateral and rotational stress off the tine members 118 and 122. The combined cooperative effect of the protrusions 84, 86 and the latching tine members 118, 122 result in a secure, rotationless interface between the container bottom and the dolly.

In the assembled condition of FIG. 1, the container and dolly can be manipulated by the user from adjacent the flat container side. The dolly fits beneath the container such that the curvilinear side of the container can be maneuvered into a corner for storage. Alternatively, the flat side of the container can be stored against a wall if so desired to conserve space. As shown, it will be appreciated that the foot plate 140 is always accessible to the user from a position adjacent the flat container side, since plate 140 projects rearward and beyond the flat container side 18.

To release the container from the dolly the foot plate 140 is pressured downward as shown in FIG. 4, bottoming out against the surface 104. Pivotal movement of the plate downward moves actuation plate 144 upward and end portion 160 presses tine member 122 inward until tine end 132 clears container flange 58. Thereupon, the container can be moved laterally and/or upwardly until the opposite tine member end 128 clears flange 60, enabling the container to be lifted up and clear of the dolly. Inward movement of tine member 122 is rendered easier by the relative height of the member which makes the cantilevered tine more flexible and easier to move. Conversely, the relatively low height of the member 118 makes it relatively stiff, which contributes to enhancing the integrity of the resulting lock.

From the foregoing it will be appreciated that a user need not touch the dolly bend, or invert the container in order to accomplish attachment of the container to the dolly. Such can be achieved by simple downward movement of the container to the dolly top surface. Similarly, disattachment of the container does not require the user to grasp the dolly, bend, or invert the container by hand. By rendering the attachment and disattachment of the dolly so convenient to the user, the subject invention facilitates more frequent emptying of the container by the user at shorter intervals, and thereby the container is less full. State of the art dolly and container assemblies are so cumbersome to separate that a user is more inclined to resist emptying the container until it is entirely full or emptying the container with the dolly still attached.

Likewise, the subject invention provides a latch that cannot be compromised or altered by use of the combined container and dolly. Unlike screw or bayonet threaded dolly attachments, the encountering, of curbs or thresholds by the wheels of the subject dolly will not alter the security of the attachment or render disengagement of the dolly more difficult since the attachment of the present invention is not achieved by rotary movement. Thus, the user need not be concerned that the attachment has loosened into an unsafe condition through use or tightened beyond the user's capacity to free it.

Lastly, it will be noted that the subject invention, comprising four molded parts is economical to manufacture and, because no assembly hardware is required, the cost of the assembly is further minimized. In addition, there are no parts that will require frequent replacement from repeated use. Thus, the assembly is durable and economical and represents a substantial improvement over more costly and less durable conventional container and dolly assemblies.

It will be noted that the subject invention comprises a dolly and container that assemble by linear movement between the container and the dolly, preferably but not necessarily linear movement of the container toward the stationary dolly. Thus, rotation of the dolly or container is not necessary and a touching of the dolly to initiate such rotation is not necessary. Rather, the container is simply lowered downward and establishes latching engagement without contact between the user and the dolly.

Moreover, the dolly and the container have interfitting protrusions and recesses, respectively, that interfit to register the container upon the dolly support surface and further to prevent any rotational movement therebetween. In the preferred embodiment, the recesses of the container into which the protrusions of the dolly fit are hand recesses in the container bottom. The hand recesses are located below the container handles and serve to receive the user's hand and facilitate a lifting of the container by the bottom when the container is separated from the dolly. Thus, each of the container recesses serve two functions; one as a hand recess for lifting the container and secondarily as a registration recess.

It is also apparent that the latching tines engage the lower portion of the container and as they snap over the container flanges, emit an audible "click" to communicate to the user that a successful attachment has been achieved. The audible sound thus acts to reassure the user and the absence of the sound indicates a lack of success. And, since the only direction by which the container can become disattached is vertically (i.e., lifting the container after its release), it is not likely to become inadvertently unattached from the dolly during use.

Finally, it will be appreciated that the pedal member is foot actuated which makes it possible to disassemble the container from the dolly without the user touching the dolly. For sanitary reasons, this is important. Preferably, the foot actuated pedal is pivotally attached to the dolly but other modes of operation will be apparent. For example, without any limitation intended, a slide mechanism can be devised that, subject to foot pressure, moves linearly to press the tine 122 out of engagement with the container.

It will be readily apparent that the container travels in a linear vertical direction relative to the dolly during the attachment procedure; i.e. it is lowered to the dolly by the handles by an erect user. The reverse linear direction is necessary for separation. It is the linear, non-rotary nature of the separation and attachment movements that makes the assembly resistant to the inadvertent separation attendant rotationally attached containers and dollies. While preferably in the vertical linear direction, the subject invention contemplates that a horizontal linear attachment of the container to the dolly may also be constructed pursuant to the teachings herein. By horizontally orienting the dolly tines and providing a vertical flange in the bottom of the container the container can slide horizontally across the top surface of the dolly until the tines snap over the vertical container flange. The foot pedal can be configured to depress one or both of the tines to free the container from the dolly. While not as convenient to assemble as the preferred embodiment which contemplates relative movement in the vertical direction, the horizontal linear attachment of the container to the dolly would provide some of the advantages, such as resistance to inadvertent separation, over the rotationally attached state of the art assemblies.

While the above describes the preferred embodiment of the subject invention, the invention is not intended to be so restricted. Other embodiments, which will be apparent to those skilled in the art, and which utilize the teachings herein set forth, intended to be within the scope and spirit of the subject invention. By way of example, without an intention to limit, the number and location of the dolly tine members may be varied. In addition, the dolly need not necessarily be used in conjunction with containers having the subject flat side, but may be used on conventional cylindrical containers. Other variations, obvious to those skilled in the art, will also be readily apparent.

We claim:

1. A refuse container comprising an elongate receptacle body defined by a bottom surface and sidewalls extending from the bottom surface to an upper rim, the sidewalls comprising a rearward substantially planar sidewall and radiused forward sidewalls whereby the receptacle body having a substantially D-shaped cross-sectional configuration; and first and second handles extending outward from opposite sides of the radiused forward sidewalls, positioned proximate the upper rim and proximate the planar rearward sidewall;

the refuse container further comprising a wheeled dolly detachably secured to the bottom body surface;

the dolly having detachment means for detaching the dolly from the bottom receptacle body surface, the detachment means comprising an actuation lever positioned proximate to the planar rearward receptacle body sidewall and accessible to a user stationed adjacent the planar rearward sidewall of the receptacle body, the actuation lever is a foot activated pedal member pivotally mounted to one side of the dolly, the foot pedal member comprising an outer foot plate, an intermediate portion pivotally coupled to the dolly, and an inner actuating portion.

2. A refuse container according to claim 1, wherein the receptacle bottom surface has at least one ledge flange and the dolly further comprising at least one latch tine projecting upward and positioned to engage the ledge flange as the receptacle bottom surface is positioned upon the dolly support surface.

3. A refuse container according to claim 2, wherein the inner actuating portion of the foot pedal member deflects the latch tine out of engagement with the ledge flange upon pivotal movement of the foot pedal member.

4. A refuse container according to claim 3, wherein the latch tine comprising a cantilever arm having a lower end secured to the dolly and a free remote second end extending outward and upward from the lower end, the second end having a locking lip for engaging over the container ledge flange.

5. A refuse container according to claim 4, wherein the locking lip has a downwardly beveled upper surface engaged by the container ledge flange to deflect the cantilever arm as the container is lowered toward the dolly support surface.

6. A refuse container according to claim 5, wherein the cantilever arm resiliently moves toward the ledge flange after the ledge flange clears the locking lip, whereby the locking lip assumes a locking position over the ledge flange.

7. A refuse container according to claim 6, wherein the actuating portion of the foot pedal deflects the cantilever arm away from one ledge flange to free the container from the dolly support surface.

8. A refuse container comprising an elongate generally cylindrical receptacle body defined by a bottom surface and radiused sidewalls extending from the bottom surface to an upper rim, the receptacle body having a planar rearward sidewall surface whereby the receptacle body having a substantially D-shaped cross-sectional configuration; and first and second handles extending outward from opposite sides of the radiused sidewalls, positioned proximate the upper rim and proximate the planar rearward sidewall surface; and a lid member having a substantially D-shaped planar configuration, pivotally coupled to the receptacle body and pivoting between a first position upon the upper rim and a second position adjacent the receptacle body radiused sidewall;

the first handle and the second handle each comprise spaced apart support plates, each plate having an inner end connected to the radiused container sidewalls and a remote outer end, and a cross-member having opposite ends connected to the remote ends of the support plates, and the lid member having a central body and spaced apart arms extending outward therefrom, the arms having remote ends adapted to pivotally attach to the opposite ends of the first handle.

9. A refuse container according to claim 8, wherein the lid member and the first handle having an engaging flange and a detent respectively for releasably locking the lid member in the second position.

10. A refuse container according to claim 8, wherein one of said handles has an upwardly opening U-shaped socket at each of the opposite ends and the lid member arms each have a pivot pin at the remote end receivable downwardly into one of the cross-member sockets, and the lid member pivoting about the pivot pins from the first to the second position.

11. A refuse container according to claim 8, further comprising a wheeled dolly having attachment means for detachably connecting the dolly to the bottom container surface.

12. A refuse container according to claim 11, wherein the attachment means comprising actuation means for initiating disengagement of the dolly from the receptacle body, and the actuation means positioned with the dolly attached to the receptacle to be accessible to a user positioned adjacent the container planar rearward side.

13. A refuse container according to claim 12, wherein the actuation means is a foot activated pedal member pivotally mounted to one side of the dolly.

14. A refuse container according to claim 13, wherein the foot pedal member comprising an outer foot plate, an intermediate portion pivotally coupled to the dolly, and an inner actuating portion.

15. A refuse container according to claim 14, wherein the receptacle bottom surface has at least one ledge flange and the dolly further comprising at least one latch tine projecting upward and positioned to engage the ledge flange as the receptacle bottom surface is positioned upon the dolly support surface.

16. A refuse container according to claim 15, wherein the inner actuating portion of the foot pedal member deflects the latch tine out of engagement with the ledge flange upon pivotal movement of the foot pedal member.

17. A refuse container comprising an elongate receptacle body defined by a bottom surface and a radiussed sidewall extending from the bottom surface to an upper rim and defining an upwardly opening receptacle cavity;
   a wheeled dolly having an upper support surface and attachment means for detachably connecting the dolly support surface to the bottom container surface and disconnect means for disconnecting the dolly from the bottom container surface, the disconnect means comprising a foot activated pedal member mounted to one side of the dolly;
   the foot pedal member comprising an outer foot plate, an intermediate portion pivotally coupled to the dolly, and an inner actuating portion.

18. A refuse container according to claim 17, wherein the receptacle bottom surface has at least one ledge flange and the dolly further comprising at least one latch tine projecting upward and positioned to engage the ledge flange as the receptacle bottom surface is positioned upon the dolly support surface.

19. A refuse container according to claim 18, wherein the latch tine comprises a downwardly beveled upper surface positioned to engage and be deflected laterally from a normal orientation by the ledge flange as the receptacle bottom surface is positioned upon the dolly support surface.

20. A refuse container according to claim 19, wherein the latch tine resiliently flexes back into the normal orientation as the ledge flange clears the latch tine beveled upper surface.

21. A refuse container according to claim 20, wherein the dolly upper support surface having a forward portion shaped and dimensioned to reside below the receptacle body bottom surface and a rearward portion at the one side of the dolly projecting outward and beyond a rearwardly disposed sidewall of the receptacle body with the receptacle body positioned upon the dolly support surface, and the foot activated pedal member having a foot actuated end portion positioned to project outward and beyond the rearward sidewall of the receptacle body with the receptacle body positioned upon the dolly support surface.

22. A refuse container according to claim 21, wherein the receptacle body rearward sidewall is substantially planar, whereby the receptacle body having a substantially D-shaped cross-sectional configuration.

23. A refuse container according to claim 22, wherein the receptacle body having first and second handles projecting outward from the receptacle body radiussed sidewall, positioned proximate to the receptacle body upper rim and proximate to the receptacle body planar rearward sidewall.

24. A refuse container according to claim 23, wherein the receptacle body further comprising a lid member pivotally attached to at least one of the first and second handles and pivoting in a direction parallel to the receptacle body planar sidewall from a closure position upon the receptacle body upper rim to an open position adjacent the receptacle body radiussed sidewall.

25. A refuse container according to claim 24, wherein the receptacle body further comprising releasable locking means for retaining the lid member in the open position.

26. A refuse container dolly comprising:
   a platform body having an upper support surface for supporting a refuse container and a plurality of wheels affixed to an underside of the platform body, whereby the platform body is mobile;
   the platform body further comprising a foot pedal cavity defined by sidewalls and a bottom surface and extending downwardly into the upper support surface and the cavity extending from an inward cavity end to a peripheral outward cavity end;
   locking means mounted to the platform body for engaging and releasably locking the refuse container to the support surface; and
   a foot pedal member mounted within the cavity and having an inward end for disengaging the locking means responsive to movement of the pedal member.

27. A refuse container dolly according to claim 26, wherein the foot pedal having an outwardly disposed, foot actuated horizontal plate portion for initiating pivotal movement of the pedal member.

28. A refuse container dolly according to claim 26, wherein the locking means comprising at least a first upwardly projecting tine member having a lower end mounted to the platform body and a remote end for engaging a bottom surface of the refuse container and the tine member moving out of engagement with the container bottom surface responsive to pressure applied by the pedal member inward end.

29. A refuse container dolly according to claim 28, wherein the tine member projects from the support surface at an acute angle.

30. A refuse container dolly according to claim 29, wherein the tine member is deflected laterally in response to engagement between the tine member remote end and the container bottom surface as the container descends upon the platform body support surface.

31. A refuse container dolly according to claim 30, wherein the tine member remote end comprises an downwardly beveled upper surface positioned to engage the container bottom surface as the container descends upon the platform body support surface.

32. A refuse container dolly according to claim 31, further comprising a second tine member having a lower end mounted to the platform body and the second tine member projecting upward from support surface in a direction opposite to the first tine member, the second tine member having a remote end for changing the container bottom surface and releasably locking thereto as the container descends upon the platform body support surface.

33. A refuse container dolly according to claim 32, wherein the lower ends of the first and the second tine members are integrally formed with the platform body support surface.

34. A refuse container dolly comprising:
   a platform body having an upper support surface for supporting a refuse container and a plurality of wheels affixed to an underside of the platform body, whereby the platform body is mobile; the platform body further comprising locking means mounted to the platform body for releasably locking the refuse container to the support surface, the locking means comprising cantilevered lock actuation means formed of resilient material that deflects laterally upon engagement with a bottom surface of the refuse container and thereafter resiliently returns in a reverse direction against the bottom surface of the refuse container for establishing locking engagement between the refuse container and the support surface.

35. A refuse container dolly according to claim 34, wherein the locking means emitting an audible sound to communicate successful achievement of locking engagement between the refuse container and the support surface.

36. A refuse container dolly according to claim 34, wherein the lock actuation means is responsive to downward movement of the container toward the platform body support surface.

37. A refuse container dolly according to claim 36, wherein the locking means comprising at least one tine member adapted to engage a bottom surface of the container as the container is lowered to the support surface.

38. A refuse container dolly according to claim 37, wherein the tine member projects upwardly from the support surface and comprises a latching end portion for engaging over a flange portion of the container bottom surface.

39. A refuse container dolly according to claim 38, wherein the lock actuating means comprising the tine latching end portion.

40. A refuse container dolly according to claim 34, wherein the dolly further comprising foot actuated disengagement means for releasing the container from the platform body support surface.

41. A refuse container dolly according to claim 40, wherein the disengagement means comprising a foot pedal pivotally mounted to the platform body.

42. A refuse container dolly according to claim 34, wherein the container attaches to the platform body support surface by being lowered downward to the support surface.

43. A refuse container dolly according to claim 34, further comprising registration means for registering the container upon the support surface to inhibit relative rotary motion therebetween.

44. A refuse container dolly according to claim 43, the registration means comprising at least one protrusion projecting upward from the support surface adapted to enter a corresponding recess in a bottom surface of the container.

45. A refuse container dolly according to claim 44, wherein the container recess comprising a hand recess for facilitating a lifting of a lower end of the container.

* * * * *